Figure 5:
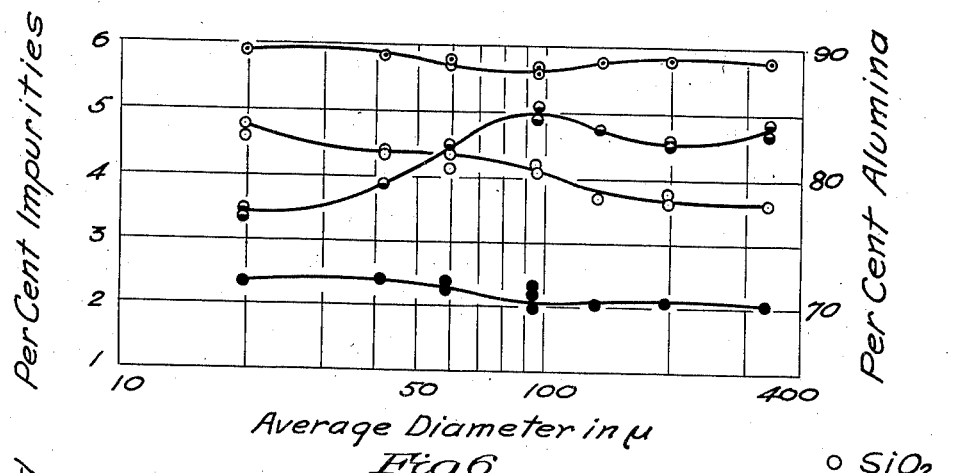

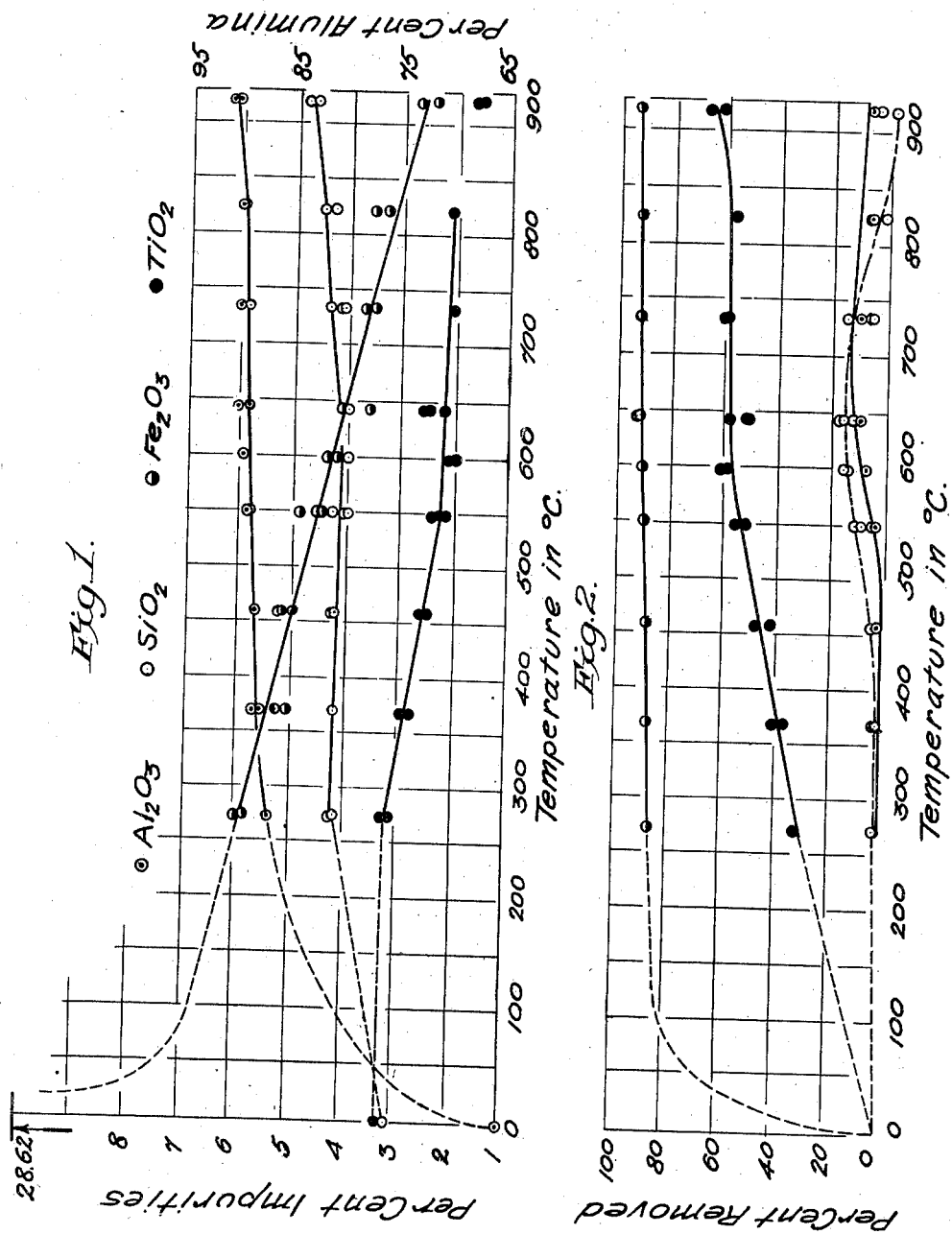

April 15, 1941.  C. G. FINK ET AL  2,238,103
PROCESS OF TREATING ALUMINOUS MATERIAL TO PRODUCE ALUMINA
Filed March 8, 1938   3 Sheets-Sheet 2
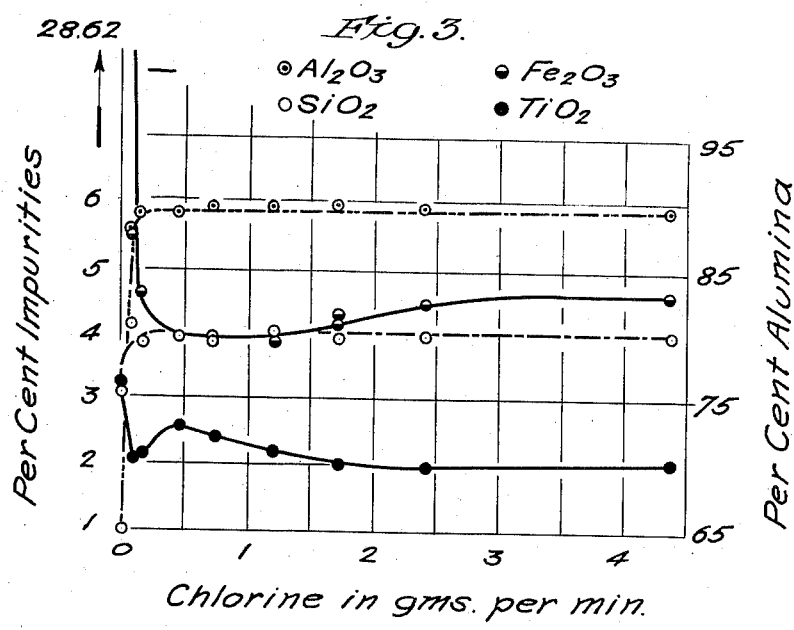
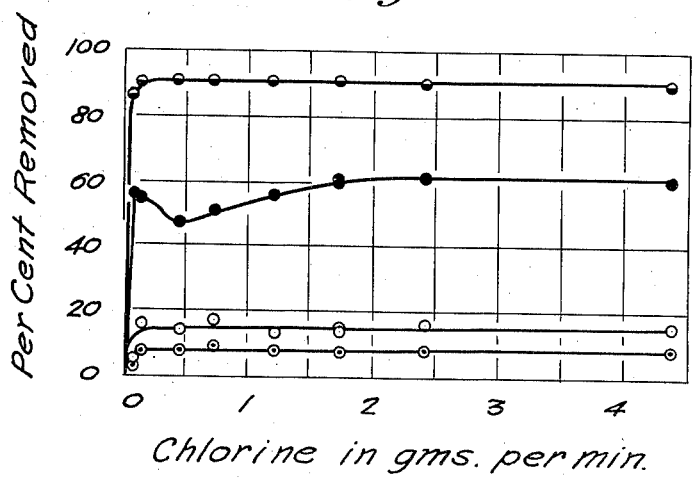
Figs. 3 & 4 Effect of the Rate of Flow of Chlorine on the Chlorination of Sulfided Istrian Bauxite
INVENTORS
Vincent S. de Marchi
BY Colin G. Fink
ATTORNEY ○ $SiO_2$
◉ $Al_2O_3$
● $TiO_2$
◉ $Fe_2O_3$ Figs. 5 & 6 Effect of Particle Size on the Chlorination of Sulfided Istrian Bauxite Patented Apr. 15, 1941

2,238,103

UNITED STATES PATENT OFFICE 2,238,103

PROCESS OF TREATING ALUMINOUS MATERIAL TO PRODUCE ALUMINA

Colin G. Fink, New York, and Vincent Salvatore de Marchi, Jamaica, N. Y.

Application March 8, 1938, Serial No. 194,718

11 Claims. (Cl. 23—141)

The present invention relates to a process for treating aluminous material to produce alumina, and more particularly to the recovery of high grade pure alumina from impure bauxites having a high iron content and from impure aluminous iron ores.

Bauxite is a term applied to minerals in which hydrated alumina predominates and in which other oxides, notably iron oxide, titanium oxide, silica and sometimes lime, occur in widely varying proportions. The term bauxite is applied to ores with practically no iron and to other deposits in which iron is present in greater quantities until the percentage of iron is so high that the rock is no longer classified as bauxite but is classified as laterite.

Harder, in "The Aluminum Industry" by Edwards, Frary and Jefferies, for example, defines bauxite "as an aluminum ore, more or less impure, in which the aluminum is largely present as hydrated oxides;" while Charrin [Chemie and Industrie, 36, 1054, (1936)] has divided the bauxites into four classes, to wit: white bauxites containing little iron and rich in silica, red bauxites containing not over 3 to 10 percent of silica on a dry basis, ferruginous bauxites containing even more iron than the red bauxites and usually over 26% $Fe_2O_3$ on the dry basis, gray bauxites containing not less than about 60% alumina, and refractory bauxites having an alumina content as low as 40% on the dry basis. The white bauxites are rarely found. Red bauxites containing not over 3 to 4% silica are used for the production of aluminum while red auxites containing not more than about 10% of silica are used for the production of aluminous cements. The ferruginous varieties are not used commercially for the production of aluminum although very abundant throughout the United States and elsewhere. Gray bauxites containing not less than 60% alumina on a dry basis are used for the production of abrasives while those containing as little as 40% alumina but having a high silica content and iron oxide content not over 3 to 4% are employed as refractories and furnace linings.

In the recent publication dealing with the aluminum industry, "The Aluminum Industry" by Edwards, Frary and Jefferies, a chapter is devoted to the problems of the production of pure alumina. In discussing this subject, Edwards and Mason state:

"Iron is an easy metal to reduce from its oxide. * * * Alumina, on the contrary, is a very difficult oxide to reduce, and when it is converted into aluminum (e. g., by electrolysis) most of the associated impurities are likewise reduced to form metals and metaloids which alloy with and contaminate the metal. The ore of aluminum must, therefore, first be treated so as to eliminate substantially all of the impurities."

These experts likewise recognize the fact that the purification of alumina is a relatively expensive process and that in view of the fact that it takes two pounds of alumina to produce a pound of aluminum, the cost of the alumina is an appreciable item in the cost of aluminum. It is apparent that the industry has been eagerly looking for a process whereby bauxites may be purified efficiently and economically on an industrial scale. In the Bayer process the by-product "red mud" may assay as high as 14% alumina. The red mud is a substantial source of loss in the purification of bauxite. A reduction in the loss of alumina in the red mud would materially reduce the costs of producing alumina and hence aluminum by the Bayer process.

In seeking a solution to the problem of the utilization of those varieties of impure bauxite having a high iron content, many attempts have been made to devise processes which would permit the treatment of high iron bauxites at a reasonable cost, in a practical manner and without uneconomical losses of alumina. Among the many attempts may be mentioned direct chlorination, using gaseous chlorine, the use of sulphur chlorides, the use of a mixture of hydrogen sulphide and chlorine and the chlorination of a mixture of bauxite and flowers of sulphur. All these attempts resulted in commercial failure.

For example, it would appear from the following tabulation that the oxides of iron, titanium, silica and aluminum could be separated by chlorination.

Table No. 1

| Investigator | Temperature of formation of chlorides from— | | | |
|---|---|---|---|---|
| | $SiO_2$ | $Fe_2O_3$ | $TiO_2$ | $Al_2O_3$ |
| | °C. | °C. | °C. | °C. |
| Spitzuin | 1200 | 400 | | |
| Kangro and Jahn | | | 800 | 800 |
| Treadwell and Gygen | | | | 1200 |
| Budnikoff and Kretch | 900 to 950 | | | Above 1000 |
| Lebedev | | 400 to 500 | 700 to 1100 | 1000 |

It would appear from the above data that it would be possible to separate these oxides by chlorination at different temperatures or what might be termed differential chlorination.

However, the application of direct chlorination of bauxite of the Istrian type, for instance, is unsuccessful on an industrial scale, as the following tests clearly show.

*Table No. 2*

|  | Original Istrian bauxite | After chlorinating 4 hrs. at 700 °C. | | After chlorinating 4 hrs. at 890 °C. | |
|---|---|---|---|---|---|
|  |  | Percent remaining | Percent removed | Percent remaining | Percent removed |
| Percent $SiO_2$ | 3.11 | 4.09 | Trace | 4.20 | 3.87 |
| Percent $Fe_2O_3$ | 28.62 | 5.26 | 86.0 | 3.23 | 87.5 |
| Percent $TiO_2$ | 3.28 | 4.19 | 3.43 | 3.79 | 6.70 |
| Percent $Al_2O_3$ | 64.99 | 86.56 | None | 88.78 | 1.12 |

Direct chlorination under these conditions definitely is not an industrial possibility since it requires a chlorination period of about 4 hours at temperatures above 700° C. to produce a suitable product.

Another suggestion for the beneficiation of high iron bauxites has been treatment with chlorides of sulphur. The chlorides of sulphur have also been suggested for the preparation of aluminum chloride at lower temperatures than those employed in direct chlorination. The application of the use of chlorides of sulphur to the improvement of Istrian bauxite as illustrative of high iron bauxites likewise fails for the reason that the loss of alumina is too high at moderate temperatures and the entire charge is volatilized at higher temperatures, as is evident from the following data:

*Table No. 3*

|  | Percent of each constituent removed— | | | | |
|---|---|---|---|---|---|
| Temperature °C | 560 | 642 | 642 | 750 | 875 |
| Duration of treatment minutes | 60 | 60 | 33 | 120 | 60 |
| $SiO_2$ | 61.6 | 90.4 | 81.6 | All | All |
| $Fe_2O_3$ | 88.5 | 99.3 | 99.1 | All | All |
| $TiO_2$ | 87.1 | 98.4 | 95.6 | All | All |
| $Al_2O_3$ | 49.9 | 70.9 | 62.4 | All | All |

It will be observed that although better than 60% of the impurities such as silica, iron and titanium, are removed by the use of sulphur chlorides, yet from 50 to 100% of the aluminum is also volatilized. It is manifest that such treatment does not provide a practical method for the separation of alumina from impurities.

The simultaneous use of a mixture of hydrogen sulphide and chlorine produces approximately the same results as the use of chlorides of sulphur, as the following tabulation clearly shows. While a large part of the iron is removed, at the same time more than about 40% of the aluminum is also volatilized, as is evident from Table 4. Clearly, the use of chlorides of sulphur or a mixture of hydrogen sulphide and chlorine results in the formation of a mixture of the chlorides which must be separated if a large loss of aluminum is to be avoided.

*Table No. 4*

|  | Percent of each constituent removed— | | | |
|---|---|---|---|---|
| Temperature of reaction °C | 550 | 642 | 642 | 825 |
| Duration of treatment minutes | 102 | 60 | 24 | 12 |
| $SiO_2$ | 35.1 | 78.0 | 66.8 | 63.7 |
| $Fe_2O_3$ | 86.5 | 95.0 | 91.5 | 92.5 |
| $TiO_2$ | 95.9 | 98.8 | 98.0 | 96.2 |
| $Al_2O_3$ | 38.6 | 75.6 | 64.6 | 53.5 |

The addition of elemental sulphur followed by chlorination does not lead to commercial results since the chlorine apparently reacts with the sulphur to form chlorides of sulphur, after which the reaction proceeds in a manner analogous to that when chlorides of sulphur are introduced as such.

Although many attempts, as the art is cognizant, have been made to treat impure aluminous material having a high iron content, none, as far as we are aware, have been wholly successful when carred into practice on an industrial scale to produce a satisfactory source of commercial aluminum and aluminum alloys.

We have discovered that aluminous material containing large amounts of iron oxide can be treated to produce an aluminous material suitable for the production of pure alumina.

It is an object of the present invention to provide a process of treating aluminous material for the recovery of a commercially acceptable source of aluminum.

It is another object of the present invention to provide a method of separating iron and other impurities from the alumina of aluminous material, including bauxites and "red mud" by chlorination when at least a portion of the impurities is present as a sulfide.

The present invention also contemplates the provision of a method of sulfidizing aluminous material and volatilizing a major portion of the impurities after chlorination.

Figure 6:
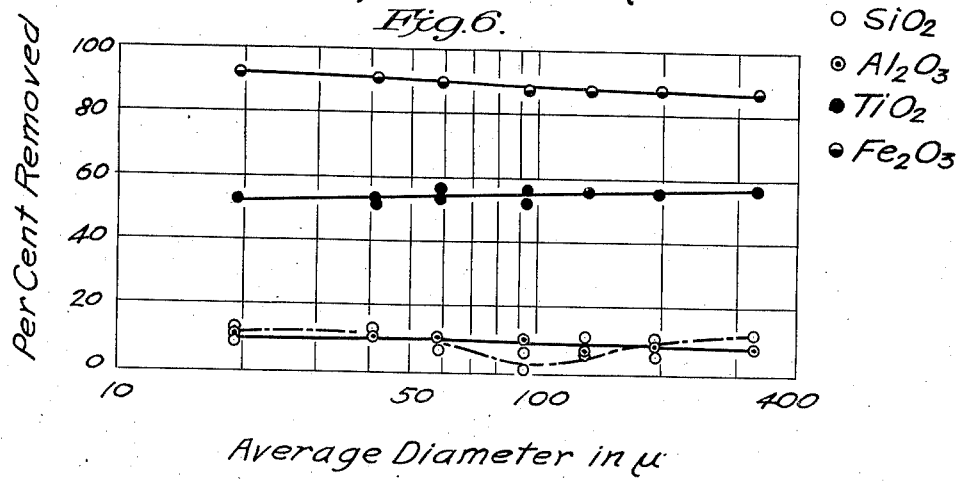

Other objects and advantages will become apparent from the following description of a preferred embodiment of a method of carrying the invention into practice and the drawings, in which Fig. 1 graphically illustrates the percentage of the constituents removed from Istrian bauxite by treatment in accordance with the principles of the present invention;

Fig. 2 graphically depicts the effect of treating Istrian bauxite at various temperatures upon the concentraion of the alumina in the bauxite;

Figs. 3 and 4 graphically represent the effect of the rate of flow of chlorine on the removal of various constituents of Istrian bauxite; and Figs. 5 and 6 illustrate graphically the effect of particle size upon the rate of removal of various constituents from Istrian bauxite.

In general, the present method contemplates first sulfidizing aluminous material under controlled conditions and then subsequently chlorinating the sulfidized mass at critical temperatures whereby the iron is preferentially chlorinated. To ensure that all or substantially all, of the iron will be sulfidized it is preferred to add an excess of sulphur. In order to avoid the effect of the presence of free sulphur, it is necessary to remove the excess of unreacted sulphur prior to chlorinating. The chlorination is preferably carried out under critical conditions of temperature, rate of flow of chlorine and particle size to obtain a purified alumina in a very short reaction period of the order of about three minutes. When this reaction time is compared with the reaction time of 4 hours when direct chlorination without sulfidation is employed, the advantages of the present method are readily appreciated. The residue from the chlorination is well adapted for the production of high grade aluminum.

For the purpose of giving those skilled in the art a better understanding of the invention, the following illustrative example is given. Finely ground impure aluminous material, such as Istrian bauxite, is thoroughly mixed preferably with an excess, say at least about 20% excess, of sulphur, say, in the form of elemental sulphur or as a sulphide which is required for reaction with the iron present. The mixture of finely divided aluminous material and sulphur is then heated to sulfidize the iron and drive off the excess of sulphur. When it is desirable, the sulfidized aluminous material substantially free of elemental or free sulphur is allowed to cool in the absence of any substantial amount of oxygen. Hungarian, French and Istrian bauxites, after heating with sulphur, become brick red to black in color. However, the color of bauxites having a comparatively low iron content changes slightly from the very light pink of the original material to a light greenish color. While the aluminous material containing large amounts of iron gives a test for hydrogen sulphide when treated with mineral acid, bauxites of the white variety such as those from Georgia and British Guiana, evolve practically no hydrogen sulphide when the sulfidized material is treated with mineral acid. Under these conditions of sulfidation, the iron oxide of the aluminous material is selectively sulfidized. To sulfidize the other oxides, titanium dioxide, silica and alumina, it would be necessary to have a reducing agent, such as carbon, present. After the sulfidation, the sulfidized aluminous material is treated with chlorine at elevated temperatures. The resulting product is white in color and of acceptable iron content.

It has been found that the application of the principles of the present invention results in the beneficiation of a variety of impure bauxites. Aluminous material from five different sources has been treated in accordance with the principles of the present invention.

For the purpose of illustrating the results of the application of the principles of the present invention to the treatment of aluminous material, the beneficiation of Istrian bauxite will be described. Istrian bauxite was mixed with about a twenty percent excess of the elemental sulphur required by the iron present and heated to a temperature above 445° C. The sulfided bauxite, substantially free from elemental sulphur, was then treated with chlorine in the ratio of about 1.5 parts of sulfided bauxite to about 1.74 parts of chlorine per minute. The chlorination of the sulfided bauxite was carried out at various temperatures between about 275° C. and about 920° C. By referring to Figs. 1 and 2, it will readily be seen that about 90% of the iron, about 65 to about 70% of the titanium dioxide and about 15 to about 20% of the silica can be removed with a loss of less than about 10% of the alumina. It is to be observed that chlorination of the iron in the sulfided aluminous material takes place even at 100° C. to about 200° C. and, in fact, at temperatures as low as room temperature. However, for various reasons, we prefer to carry out the chlorination at temperatures between about 275° C. and about 920° C. Within this temperature range substantially complete chlorination of the iron can be obtained in as little as five minutes. For example, 70% of the iron is removed after chlorination for about 1 minute or less. After about three minutes' treatment with chlorine, about 90% of the iron has been volatilized. Those skilled in the art will readily appreciate the beneficiation of the aluminous material obtained by the application of the principles of the present invention by referring to Fig. 1 which illustrates graphically the facts summarized in the following table:

Table No. 5

| Temperature of chlorination | Istrian bauxite composition of chlorinated product | | | |
| --- | --- | --- | --- | --- |
| | Percent Al$_2$O$_3$ | Percent Fe$_2$O$_3$ | Percent SiO$_2$ | Percent TiO$_2$ |
| Original bauxite | 65.15 | 28.25 | 3.39 | 3.21 |
| 275° C | 87.0 | 5.9 | 4.1 | 3.1 |
| 370° C | 88.0 | 5.1 | 4.1 | 2.9 |
| 460° C | 88.0 | 5.1 | 4.1 | 2.5 |
| 550° C | 89.0 | 4.5 | 4.1 | 2.3 |
| 600° C | 89.0 | 4.3 | 4.1 | 2.0 |
| 640° C | 90.0 | 3.8 | 4.0 | 2.1 |
| 730° C | 90.0 | 3.6 | 4.2 | 2.1 |
| 830° C | 90.0 | 3.1 | 4.5 | 2.1 |
| 920° C | 91.0 | 2.6 | 4.8 | 1.6 |

Clearly, a bauxite which is of no practical value in the manufacture of aluminum has been beneficiated to such an extent by the application of the principles of the present invention that the chlorinated product is an acceptable commercial product.

While the ferruginous variety of bauxite, French and Hungarian, and byproduct "red mud" behave in a manner similar to that of Istrian bauxite, white bauxites such as those from British Guiana and Georgia behave somewhat differently. In the latter, the amount of iron oxide is low, and therefore, when treated with sulphur, the sulfide formed is negligible. The red and ferruginous varieties start to sinter slowly as the temperature increases when chlorinated above 600° C., but sintering does not occur when white bauxites are chlorinated above 600° C.

The effect of the rate of flow of chlorine is brought out very clearly by the following results of a series of tests made with Istrian bauxite. Istrian bauxite was sulfided and chlorinated at 600° C. for 30 minutes at various rates of chlorine flow. Figs. 3 and 4 depict graphically the results obtained. The curves indicate that a rate of flow of 0.16 part by weight of chlorine per minute is sufficient to eliminate a small amount of silica and alumina and that at higher rates of chlorine flow, these two oxides remain almost entirely stable and unaffected. In contrast with these, sulfided iron oxide is removed almost completely even at a very slow rate of flow of chlorine. It is to be observed that as the amount of chlorine per minute increases, the percentage of titanium dioxide chlorinated becomes less and less until it reaches a minimum at a chlorine rate of flow of about 0.461 part by weight per minute. Upon increasing the rate of flow of the chlorine, the titanium dioxide chlorinated increases until a maximum is reached at a rate of about 1.74 parts by weight per minute. Further increases in the rate of flow of chlorine beyond 1.74 parts by weight per minute does not increase the amount of titanium dioxide removed.

Samples of various varieties of bauxite have been treated in the following manner. All the bauxites were brought to —400 mesh. All samples were chlorinated at 600° C. for 30 minutes with a chlorine flow of about 1.74 parts by weight per minute. The concentration of alumina in accordance with the principles of the present invention is illustrated in the following table:

Table No. 6

| Bauxite | Composition | | | | Removed | | | |
|---|---|---|---|---|---|---|---|---|
| | $SiO_2$ Percent | $Fe_2O_3$ Percent | $TiO_2$ Percent | $Al_2O_3$ Percent | $SiO_2$ Percent | $Fe_2O_3$ Percent | $TiO_2$ Percent | $Al_2O_3$ Percent |
| Hungarian original | 2.69 | 41.93 | 2.80 | 52.58 | | | | |
| Chlorinated | 5.04 | 2.84 | 2.94 | 89.19 | 13.2 | 96.9 | 51.2 | 21.2 |
| French original | 2.83 | 33.12 | 3.26 | 60.78 | | | | |
| Chlorinated | 3.93 | 4.38 | 2.82 | 88.87 | 18.0 | 92.3 | 47.9 | 13.6 |
| Istrian original | 3.39 | 28.25 | 3.21 | 65.15 | | | | |
| Chlorinated | 4.65 | 3.50 | 2.33 | 89.53 | 9.75 | 92.1 | 52.4 | 9.53 |
| British Guiana original | 11.98 | 2.37 | 2.90 | 82.75 | | | | |
| Chlorinated | 12.24 | 1.23 | 2.59 | 83.95 | 1.47 | 50.5 | 14.2 | 2.49 |
| Georgian original | 18.68 | 1.72 | 3.17 | 76.43 | | | | |
| Chlorinated | 18.72 | 1.48 | 3.18 | 76.63 | 1.99 | 15.8 | 1.56 | 1.51 |

Fig. 5 illustrates the results of tests made to determine the effect of particle size upon the chlorination of sulfided Istrian bauxite. Istrian bauxite was sulfided and chlorinated at 600° C., with a chlorine flow of about 1.74 parts by weight per minute for 30 minutes. The slight increase of titanium dioxide as the particle size decreases may be accounted for largely by the more effective chlorination of the iron oxide as the particle size becomes smaller and smaller. This is quite evident when the slope of the line representing the increase in per cent iron oxide removed and the slope of the line representing the decrease in the amount of titanium dioxide removed are analyzed as shown in Fig. 6. The slopes of these two lines are almost equal and of opposite sign. The amount of alumina removed is almost constant for each different range of particle size.

Chlorine has a maximum effect on sulfided iron at an average particle size diameter of about 197 microns but its effect decreases until it reaches a particle size of about 94 microns due probably to channeling. From here on as the average diameter decreases, the effect increases so that more iron is transformed into chloride.

The maximum amount of silica is removed at particle sizes of about 19 to about 94 microns with a minimum removed at a particle size of about 94 microns. This minimum silica removal corresponds to the minimum effect of chlorine on sulfided iron.

The examination of Fig. 6 shows that the silica curve has two maxima, one at an average particle diameter of about 197 microns and the other at an average particle diameter of about 31 microns. From a consideration of the silica and iron curves, it is apparent that there is a critical range of particle size between about 130 microns and about 94 microns. If the beneficiated bauxite or other aluminous material is to be used for the production of aluminum metal, a particle size of about 200 microns is to be preferred. On the other hand, for use in the manufacture of refractories or aluminum salts, where a very low iron oxide is desired, a particle size less than about 60 microns is preferable.

In a modification of the process of the present invention, sulfided bauxite originally containing about 15% iron oxide was chlorinated in aqueous suspension. It was found that solutions or suspensions of sulfided bauxite in ferric chloride, sulphuric or hydrochloric acid can be chlorinated. In carrying the modified process into operation, the aluminous material is sulfided, as described hereinabove, cooled and suspended in water, etc. Upon passing chlorine through the suspension, the iron goes into solution, leaving a whitish residue of alumina which may be separated and dried.

Although the present invention has been described in conjunction with a preferred embodiment, it is to be understood that variations and modifications may be made as those skilled in the art will readily understand. Thus it is to be understood that the term aluminous materials includes not only bauxites but other aluminum containing material, such as "red mud" obtained as a by-product of the Bayer process for the recovery of alumina. Furthermore, alkali metal sulphides and polysulphides, iron pyrite and hydrogen sulphide may be employed in the sulphidizing step in place of all or a part of the elemental sulphur. The use of sodium chloride may be made as a substitute for chlorine by thoroughly mixing the sulfided aluminous material with sodium chloride in a ratio depending upon the iron oxide content of the aluminous material. For example, sulfided Istrian bauxite was mixed in the ratio of about 1 pound of sulfidized bauxite to 3 pounds of sodium chloride or common salt and heated. Such variations and modification are considered to be within the purview of the specification and the scope of the appended claims.

We claim:

1. The process of purifying aluminous material which comprises treating aluminous material containing iron, titanium and silicon as impurities to sulfidize a major portion of the impurities present, treating said sulfidized material in a dry state with chlorine at temperatures of about normal room temperature to about 920° C. to form chlorides of said impurities, and separating said chlorides from unattacked alumina whereby alumina of commercial purity is obtained.

2. The process of purifying aluminous material which comprises treating aluminous material containing a major portion of the impurities in the form of sulfides and aluminum in non-sulfide form with chlorine containing gases at temperatures of about 275° C. to about 920° C. to form chlorides of said impurities, and separating said chlorides from unattacked alumina whereby aluminous material containing less than about 6% $Fe_2O_3$ is obtained.

3. The process of purifying aluminous material which comprises mixing aluminous material having a particle size finer than about 400 mesh containing about 28% to about 42% $Fe_2O_3$, about 52% to about 65% $Al_2O_3$ and small amounts of other impurities including titanium compounds and silica with an amount of elemental sulfur in excess of the amount required to sulphidize said iron oxide to form a mixture substantially devoid of carbonaceous reducing agents, heating said mixture at temperature above about 445° C. to obtain sulfidized aluminous material substantially devoid of free sulfur and sulfur compounds of aluminum and containing substantially all of said iron and only a portion of said other impurities as sulfides, treating said sulfidized aluminous material with chlorine in a ratio of about 1.5 parts by weight of sulfidized material to about 1.74 parts by weight of chlorine per minute at elevated temperatures of about 275° C. to about 920° C. for about 5 minutes whereby a purified aluminous material is obtained containing not more than about 6% $Fe_2O_3$ and not more than about 3% $TiO_2$.

4. The process of purifying aluminous material which comprises mixing comminuted aluminous material containing more than about 15% $Fe_2O_3$ together with small amounts of other impurities including $TiO_2$ and silica with an amount of sulfur in excess of amount required to sulphidize said iron oxide to form a mixture substantially devoid of carbonaceous reducing agents, heating said mixture at a temperature above about 445° C. until practically all of said iron and only a portion of said other impurities are sulfidized to obtain sulfidized aluminous material substantially devoid of free sulfur and sulfur compounds of aluminum, treating said sulfidized aluminous material in a substantially dry state with chlorine in the ratio of about 1.5 parts of sulfidized material to about 0.16 to about 1.74 parts by weight of chlorine per minute at temperatures of about 275° C. to about 920° C. until a major portion of said $Fe_2O_3$ is removed whereby purified aluminous material is obtained.

5. The process of purifying aluminous material which comprises mixing aluminous material containing more than about 15% $Fe_2O_3$ together with small amounts of other impurities including $TiO_2$ and $SiO_2$ with an amount of sulfur about 20% in excess of amount required to sulphidize said iron oxide to form a mixture, heating said mixture at temperatures above about 445° C. until the major portion of impurities is sulfidized to obtain sulfidized aluminous material substantially devoid of sulfur compounds of aluminum, subjecting said sulfidized material to the action of gases containing chlorine to form chlorides of said iron and other impurities at temperatures above the vaporization point of iron chloride and below the decomposition temperature of said chlorides, vaporizing chlorides thus formed to leave a residue of alumina of commercial purity.

6. The process of purifying aluminous material which comprises treating aluminous material containing more than about 15% $Fe_2O_3$ together with other impurities including $TiO_2$ and $SiO_2$ with an amount of at least one sulfur-bearing material selected from the group consisting of elemental sulfur, iron pyrite, alkali metal sulfide and polysulfide, and hydrogen sulfide in excess of the amount required to sulphidize said iron oxide to sulfidize a major portion of said impurities and to form sulfidized aluminous material substantially devoid of sulfur compounds of aluminum, reacting said sulfidized material with chlorine to form chlorides of said iron and other impurities, and separating said chlorides from said non-sulfidized alumina whereby alumina of commercial purity is obtained.

7. The process of purifying aluminous material which comprises treating aluminous material containing impurities including iron, titanium and silicon in the absence of reducing agents in the presence of which substantial amounts of alumina are reduced to the sulphide to sulfidize a major portion of said impurities and to obtain sulfidized material, and reacting said sulfidized material with chlorine to form chlorides of said impurities and to leave a residue consisting substantially of alumina whereby alumina of commercial purity is obtained.

8. The process of treating aluminous material which comprises treating aluminous material containing iron oxide and other non-aluminous substances with sulfur in excess of the amount required to sulphidize said iron oxide to form sulfided aluminous material, removing free sulfur, suspending said sulfided aluminous material substantially devoid of sulfidized alumina in a solvent for iron chloride to form a suspension, passing chlorine through said suspension until iron passes into solution leaving a residue and separating said residue whereby a purified alumina is produced.

9. The process of treating aluminous material which comprises suspending aluminous material containing an appreciable amount of iron sulfide and oxides of other non-aluminous substances in a solvent for iron chloride and passing chlorine therethrough until the iron present passes into solution leaving a residue and separating said residue whereby purified alumina is produced.

10. The process for treating aluminous material which comprises treating aluminous material containing iron oxide and other non-aluminous substances with sulfur in excess of the amount required to sulphidize said iron oxide to form sulfided aluminous material substantially devoid of sulfidized alumina, removing free sulfur, suspending said sulfided aluminous material in a member of the group consisting of aqueous ferric chloride, sulfuric acid, hydrochloric acid and water to form a suspension, passing chlorine through said suspension until iron passes into solution and leaves a whitish residue and separating said residue whereby a purified alumina is produced.

11. The process of treating aluminous material which comprises treating aluminous material containing iron oxide and other non-aluminous substances with sulfur in excess of the amount required to sulphidize said iron oxide to form sulfided aluminous material substantially devoid of sulfidized alumina, removing free sulfur, suspending said sulfided aluminous material in water to form a suspension, passing chlorine through said suspension until iron passes into solution leaving a residue and separating said residue whereby a purified alumina is produced.

COLIN G. FINK.
VINCENT SALVATORE DE MARCHI.